(12) United States Patent
Chang Chien (10) Patent No.: US 7,263,926 B2
(45) Date of Patent: Sep. 4, 2007

(54) STRUCTURE OF A FRUIT AND VEGETABLE PROCESSOR

(76) Inventor: Sung Shan Chang Chien, c/o PMB#1008, 1867 Ygnacio Valley Rd., Walnut Creek, CA (US) 94598

( * ) Notice: Subject to any disclaimer, the term of this patent is extended or adjusted under 35 U.S.C. 154(b) by 525 days.

(21) Appl. No.: 11/033,294

(22) Filed: Jan. 12, 2005

(65) Prior Publication Data

US 2006/0150830 A1    Jul. 13, 2006

(51) Int. Cl.
*A23L 1/00* (2006.01)

(52) U.S. Cl. .............................. 99/510; 99/348; 99/495

(58) Field of Classification Search ............... 99/348, 99/509–513, 485, 467, 495, 492; 366/205, 366/206, 96–98, 197, 314, 199, 315, 342, 366/307, 343, 309; 241/282.1, 282.2, 282.5, 241/292.1, 97, 98, 46.17, 199.12, 37.5, 92, 241/285.1, 285.2; 403/330; D7/206, 378
See application file for complete search history.

(56) References Cited

U.S. PATENT DOCUMENTS

| 5,662,032 A | * | 9/1997 | Baratta | 99/513 |
| 6,135,019 A | * | 10/2000 | Chou | 99/513 |
| 6,595,121 B1 | * | 7/2003 | Chang Chien | 99/510 |
| 6,837,153 B1 | * | 1/2005 | Chang Chien | 99/510 |

* cited by examiner

*Primary Examiner*—Timothy F. Simone
(74) *Attorney, Agent, or Firm*—Leong C. Lei (57) ABSTRACT

An improved structure of a fruit and vegetable processor is disclosed. The processor comprises a base seat, a power unit located within the base seat, a cup body, a blade mounted within the cup body and rotated by the power unit, a cap, at least a passage which passed through the cup body to the outside thereof, characterized in that the inner wall at the side of the passage is mounted with a filtering means extended upward from the bottom section of the cup body, and a distance is formed between the filtering means and the inner wall of the cup body.

3 Claims, 8 Drawing Sheets

STRUCTURE OF A FRUIT AND VEGETABLE PROCESSOR

BACKGROUND OF THE INVENTION (a) Technical Field of the Invention

The present invention relates to an improved structure of a fruit and vegetable processor, and in particular, to a processor having a passage at one side of the bottom section of the cup body of the processor. A filtering means is provided to the interior of the cup body.

(b) Description of the Prior Art

Figure 1:
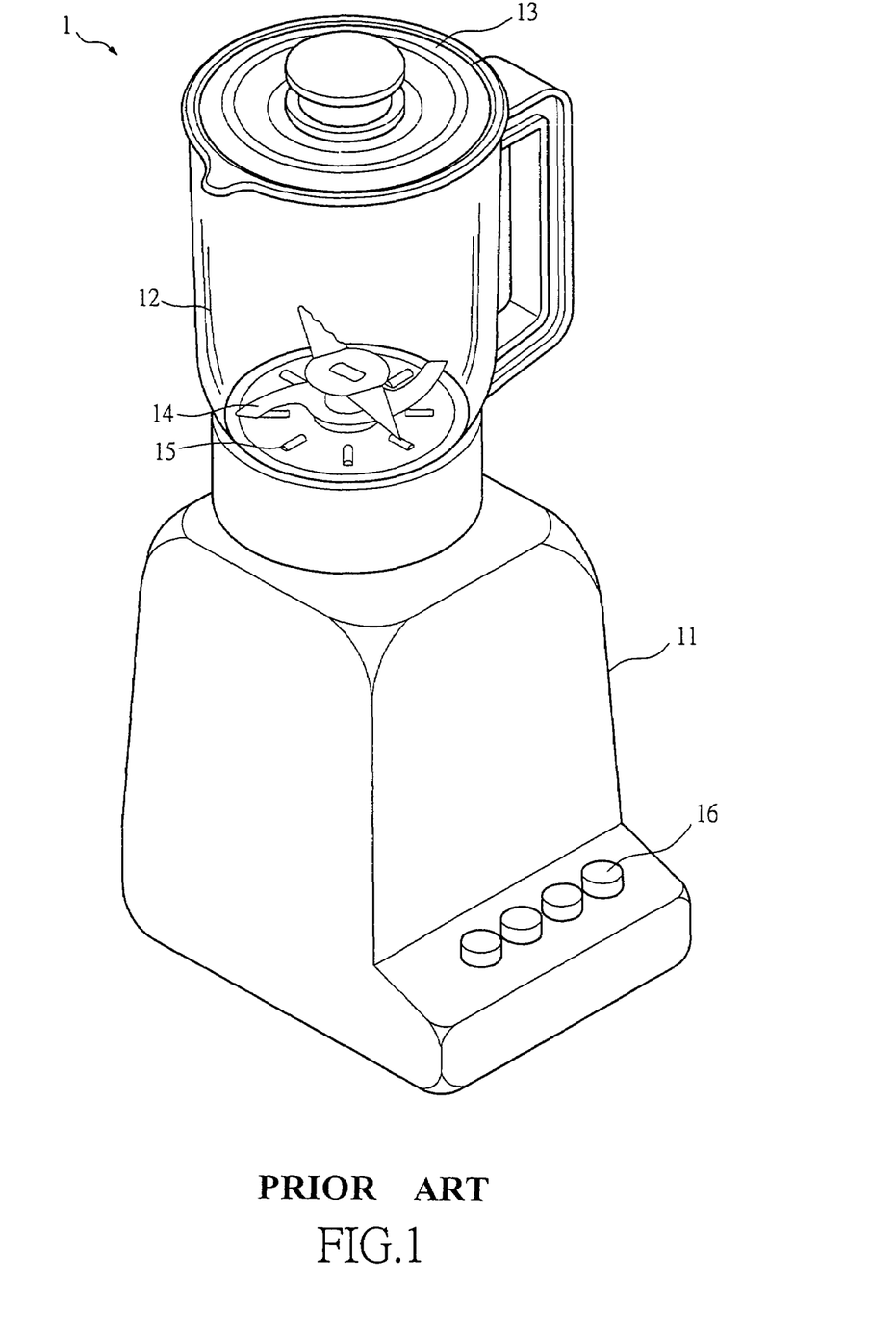
FIG. 1 is a perspective view of a conventional fruit and vegetable processor.

FIG. 1 is a conventional fruit and vegetable processor 1 having a base seat 11 mounted with a cup body 12. The opening of the cup body 12 is closed with a cap 13. A motor is provided at the interior 2 of the base seat 11 and the shaft of the motor drives the blade 14 mounted to the bottom section of the cup body 12. The bottom of the cup body 12 has a plurality of blocks 15 which are used to prevent the blade 14 from rotating with the motor. The extracted juice has to be poured out for filtering.

Figure 2:
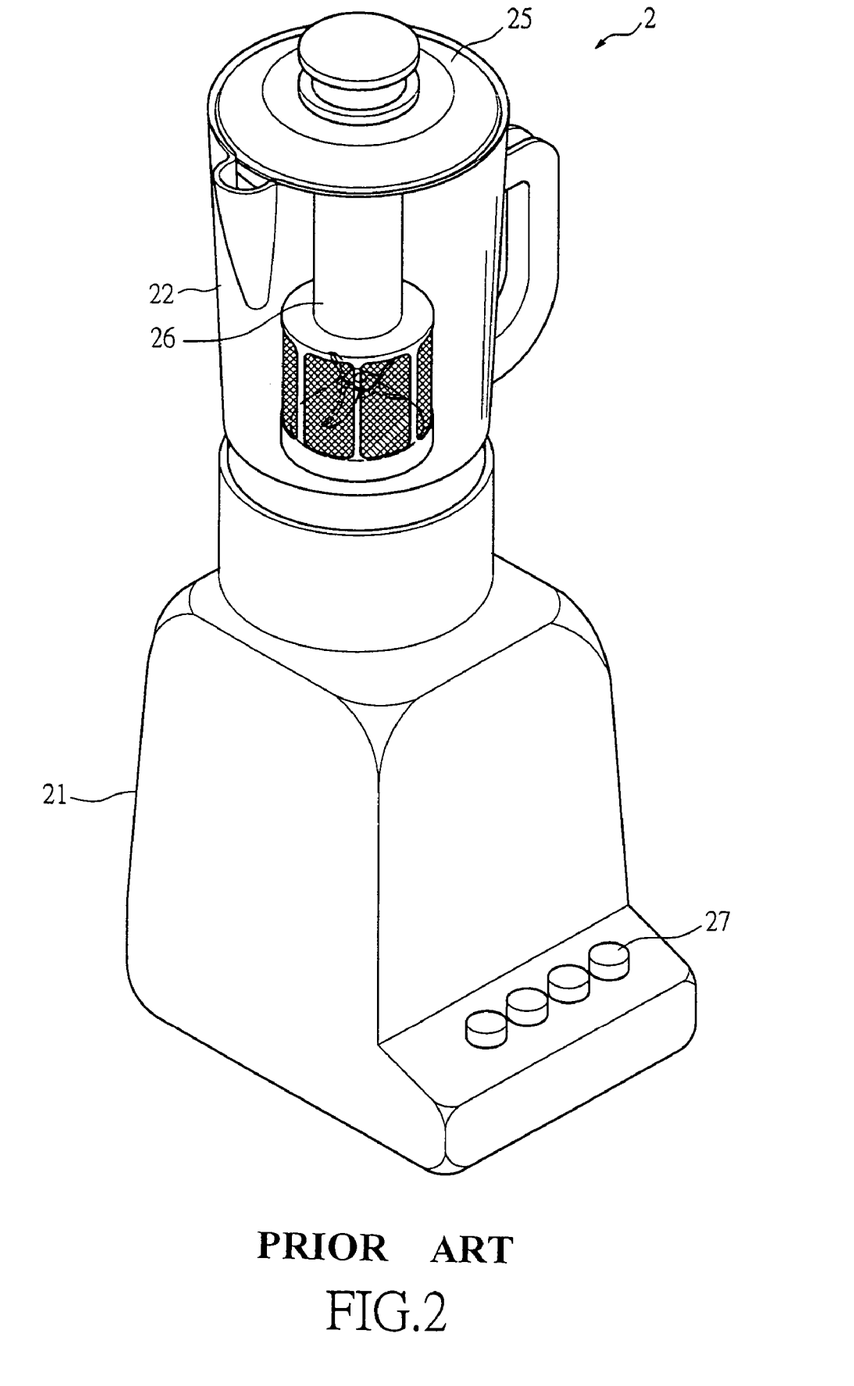
FIG. 2 is a perspective view of another conventional fruit and vegetable processor.

FIG 2 is another fruit and vegetable processor having a base seat 12 mounted with a cup body 22. A motor is provided to the base seat 21 and the shaft of the motor drives the blade 23 at the bottom section of the cup body. The blade 23 is short and the external housing of the blade 23 has a filtering cylinder 24. The center of the cap 25 has a hole for insertion of a feeding tube 26. The cup body 22 can be unloaded from the base seat 21 so as to pour out the juice or the like.

Figure 3:
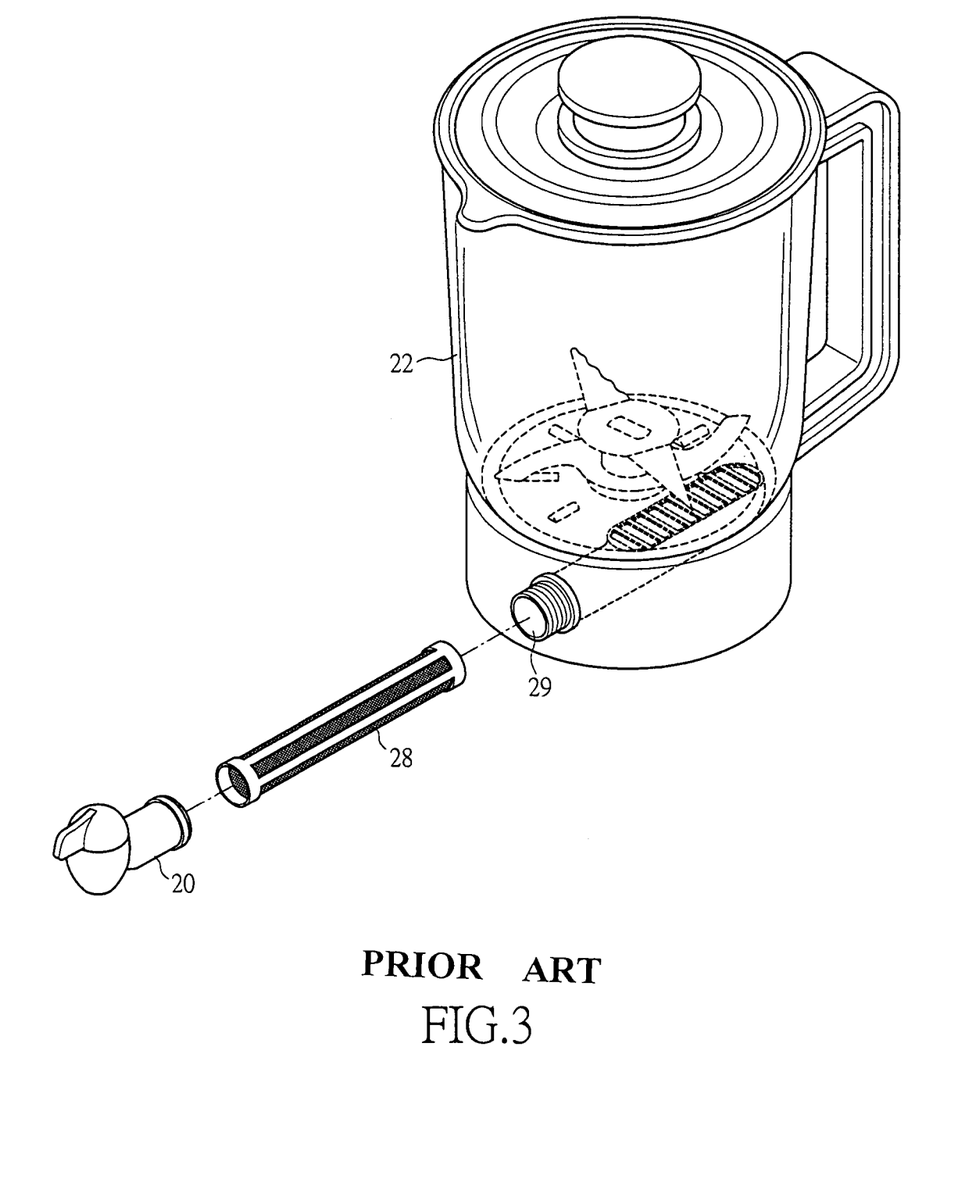
FIG. 3 is an exploded view of a conventional fruit and vegetable processor disclosed in Taiwan Utility Patent Application No. 91219150.
Figure 4:
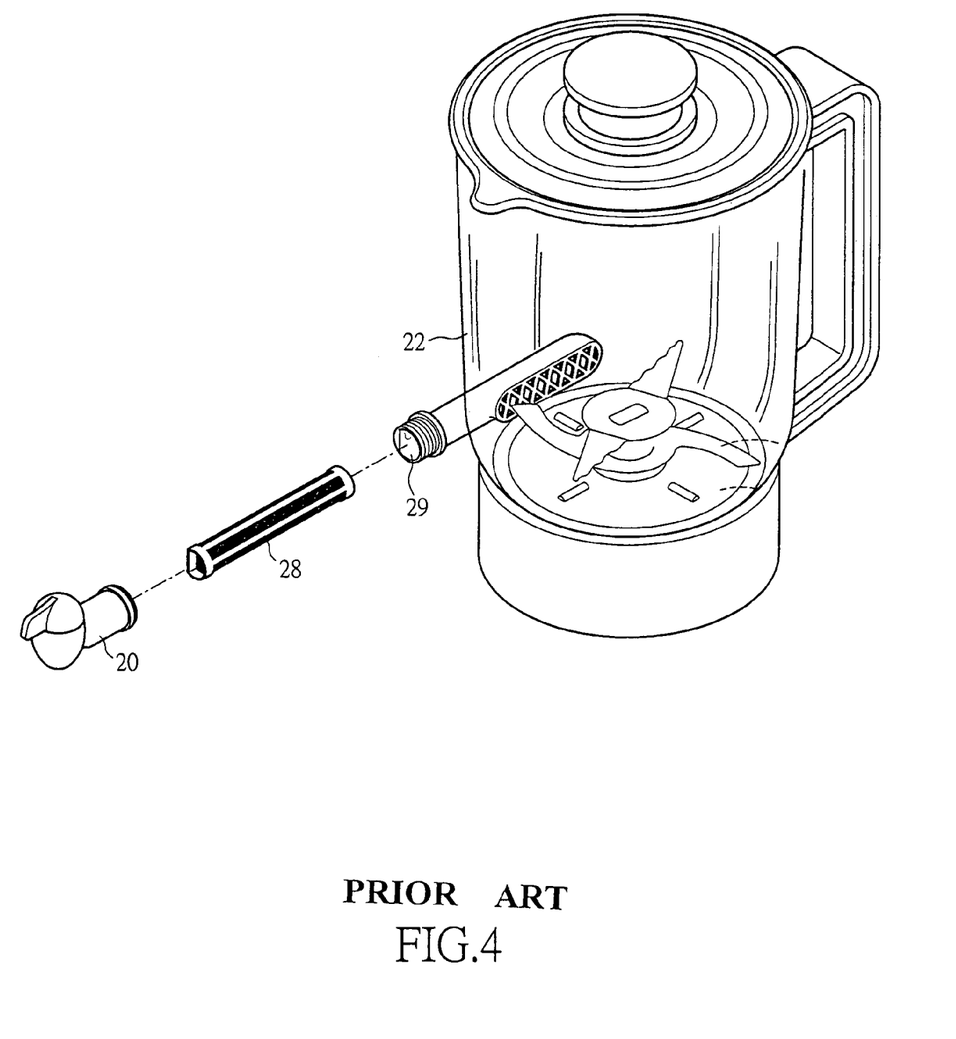
FIG. 4 is an exploded view of a conventional fruit and vegetable processor disclosed in Taiwan Utility Patent Application No. 92221077.

FIG. 3 shows a conventional fruit and vegetable processor for Taiwan Utility Model Application No. 91219150, and FIG 4 shows another fruit and vegetable processor for Taiwan Utility Model Application No. 92221077. The bottom side of the cup body 22 has a filtering screen 28 and a passage 29.

SUMMARY OF THE INVENTION

The primary purpose of the present invention is to provide an improved structure of a fruit and vegetable processor comprising a base seat, a power unit located within the base seat, a cup body, a blade mounted within the cup body and rotated by the power unit, a cap, at least a passage which passes through the cup body to the outside thereof, characterized in that the inner wall at the side of the passage is mounted with a filtering means extended upward from the bottom section of the cup body, and a distance is formed between the filtering means and the inner wall of the cup body.

Yet another object of the present invention is to provide an improved structure of a fruit and vegetable processor, wherein the end head of the passage is mounted with a valve to allow the extracted juice to flow out from the cup body, and the cup body has a larger capacity to process fruit and vegetable to extract juice.

Still yet another object of the present invention is to provide an improved structure of a fruit and vegetable processor, wherein the inner side of the cup body has a corresponding sliding slot to engage with the filtering means so as to facilitate the replacement of filtering means.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 5:
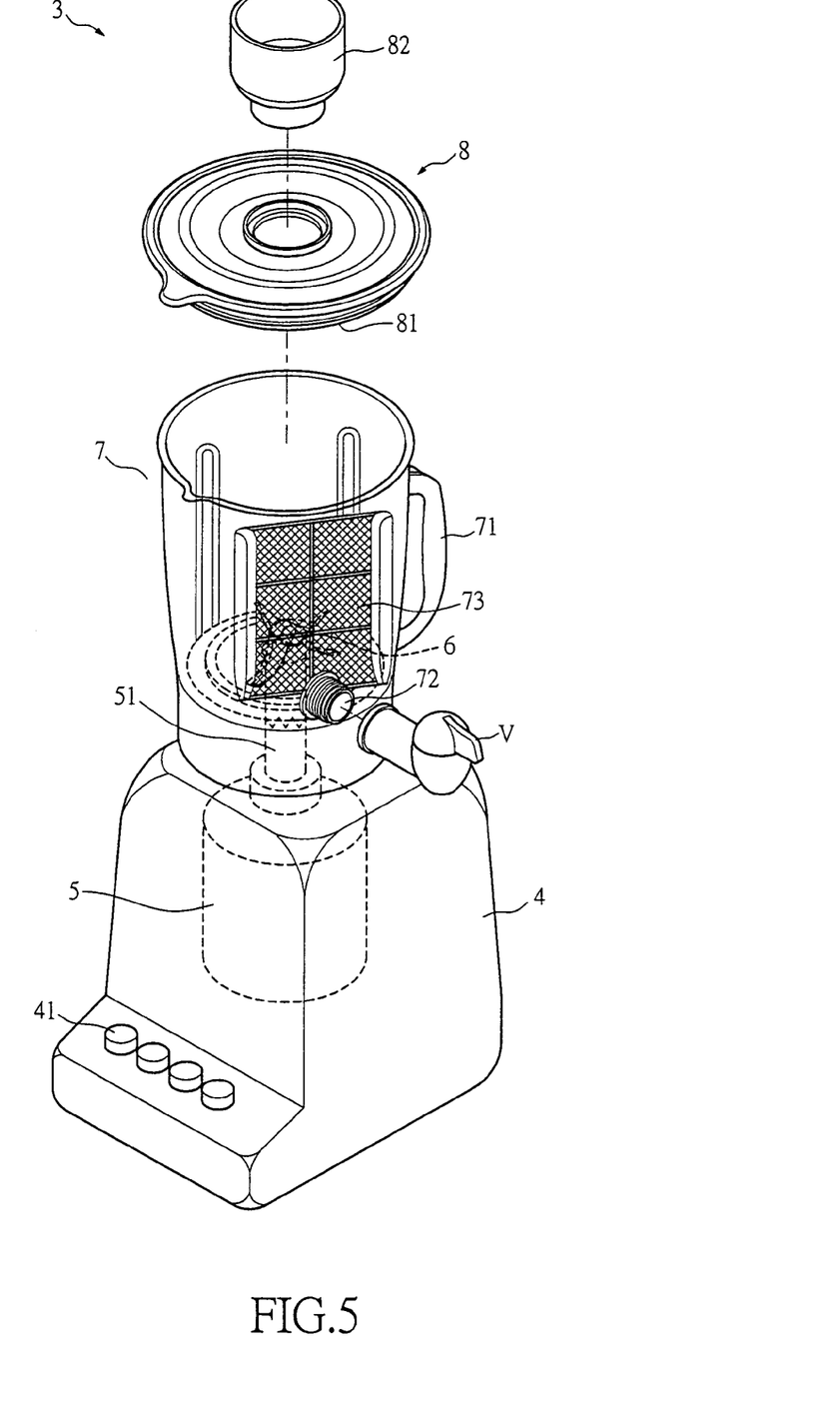
FIG. 5 is an exploded perspective view of the present invention.

Referring to FIG. 5, there is shown a fruit and vegetable processor 3 having a base seat 4, a power unit 5 mounted within the base seat 4, a blade 6 rotated by the power unit 5, a cup body 7, and a cap 8 for covering the cup body 7 at the top thereof.

The base seat 4 is a hollow box body which can contain the power unit 5, and the top end of the base seat 4 can be placed with the cup body 7. A control module 41 is mounted on the base seat 4 to control the power unit 5, and the power unit 5 is an electrically powered motor. A transmission element 51 is connected to the blade 6 within the cup body 7 and the blade 6 is driven by the power unit 5.

The blade is provided to the bottom end of the cup body 7 and a handle 71 is mounted to one side of the cup body 7. The bottom end of the cup body 7 has a passage 72 passed through the cup body 7. The outer end of the passage 72 is connected with a valve V which controls the opening or closing of the passage 72. A filtering means 73 is provided to passage 72 at the interior of the cup body 7.

The filtering means 73 is extended upward from the bottom section of the cup body 7 and has a distance with the internal wall of the cup body 7. The top end of the cup body 7 has an opening which can be with the cap 8. When the cap 8 covers the cup body 7, the bottom edge 81 at the bottom end of the cap 8 urges the filtering means 73. The cap 8 can be mounted with a top cover 82 having a hole 821 which passes through to the cup body 7.

Figure 6:
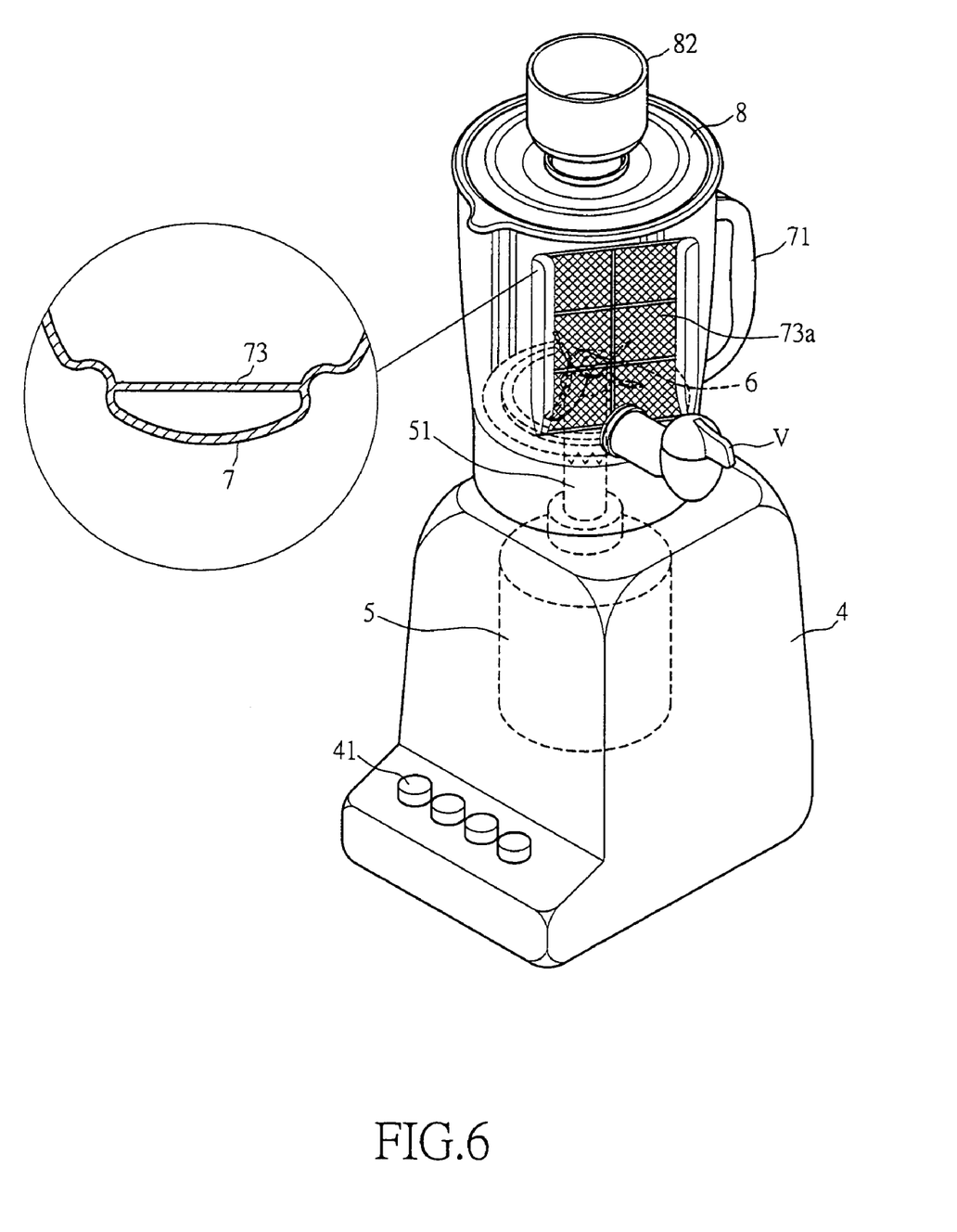
FIG. 6 is a preferred embodiment in accordance with the present invention.

As shown in FIG. 6, the cup body 7 is placed onto the top end of the base seat 4 and fruit and vegetable or the like is placed into the cup body 7. The cap 8 is then arranged on the cup body 7. Water or the like is added via the top cover 82. The control module 41 operates and controls the power unit 5. The speed of the power unit 5 can be controlled and the blade 6 is driven by the power unit 5. The fruit and vegetable are processed, and the juice is then extracted and flows via the passage 72 to the valve V The filtering means 73 is positioned at the lateral wall within the cup body 7 and the filtering means 73 is upwardly arranged as a plate-like structure. Therefore, it provides a larger area of filtering and the rate of the filtration is faster. Further the cup body 7 has a larger space to contain fruit and vegetable which are to be processed.

Figure 7:
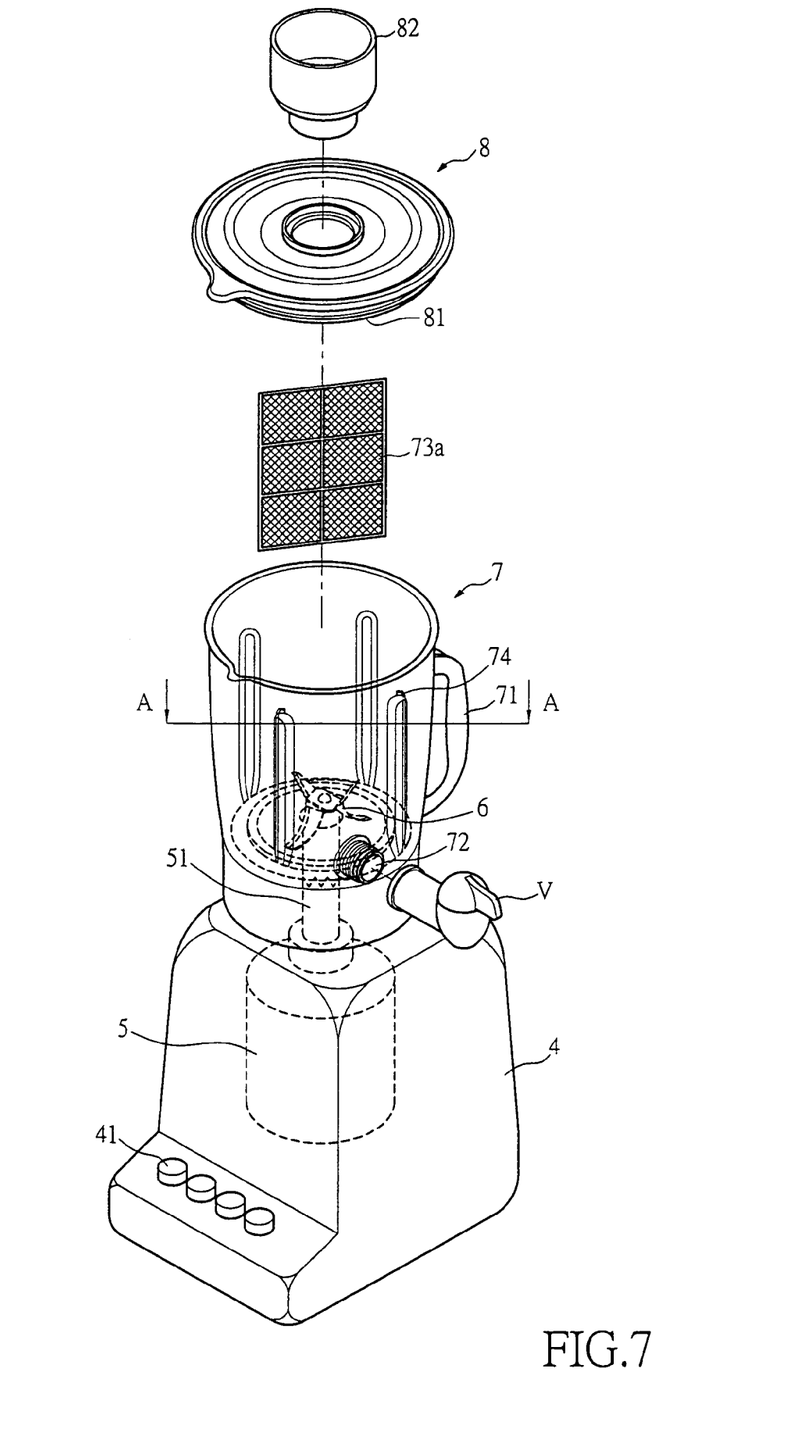
FIG. 7 is another preferred embodiment in accordance with the present invention.
Figure 8:
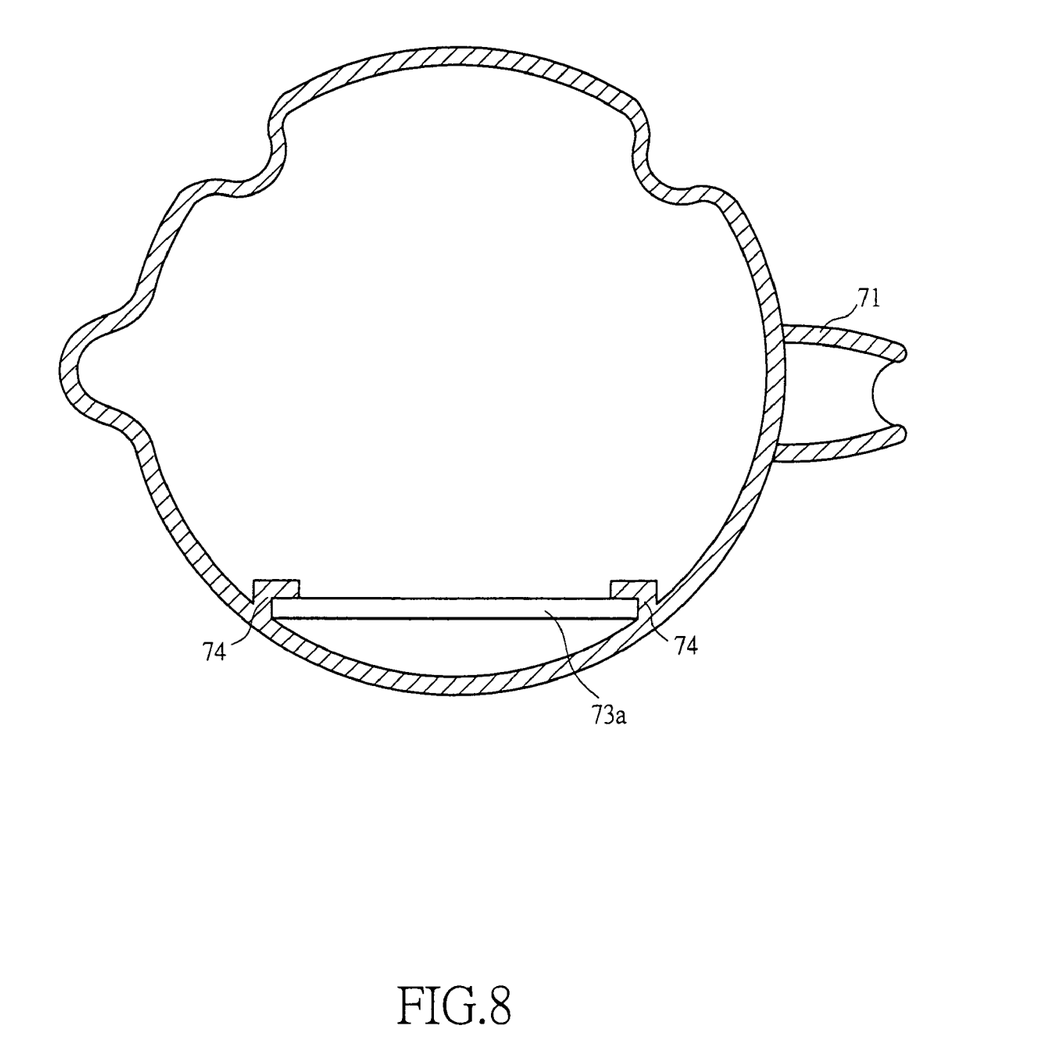
FIG. 8 is a sectional view of FIG. 7 of the present invention.

Referring to FIGS. 7 and 8, the cup body 7 is provided with a corresponding sliding slot 74 which can engage with filtering element 73a. Thus, the filtering element 73a can be freely withdrawn from the sliding slot 7 to use for various type of processed fruit or vegetable. In this case, filtering element 73a with various sizes of filtering sieve is used. Accordingly, the improved structure of the fruit and vegetable processor can be used widely.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a fruit and vegetable processor comprising:
    a base seat;
    a power unit arranged within said base seat;
    a cup body arranged on said base seat, said cup body having two opposite slots;
    a blade mounted within said cup body and driven by said power unit;
    a cap adapted to cover said cup body;
    at least a passage passing through said cup body to connect with a valve; and
    a filtering means fitted between said two opposite slots of said cup body.

2. The structure of a fruit and vegetable processor as claimed in claim 1, wherein said cap has a bottom edge which urges a top of said filtering means thereby keeping said filtering means in position.

3. The structure of a fruit and vegetable processor as claimed in claim 1, further comprising a top cover adapted to be mounted on said cap and having a hole passing through to said cup body.

* * * * *